Oct. 20, 1925.

C. E. JOHNSON

PISTON RING 1,558,092

Filed May 19, 1924     2 Sheets-Sheet 1

Inventor
Charles E. Johnson
By Frank E. Liman, Jr.
Attorney.

Oct. 20, 1925.  
C. E. JOHNSON  
PISTON RING  
Filed May 19, 1924

Inventor  
Charles E. Johnson  
By Frank E. Liverance, Jr.  
Attorney.

Patented Oct. 20, 1925.

1,558,092

UNITED STATES PATENT OFFICE.

CHARLES E. JOHNSON, OF MUSKEGON, MICHIGAN, ASSIGNOR TO THE PISTON RING COMPANY, OF MUSKEGON HEIGHTS, MICHIGAN, A CORPORATION OF MICHIGAN.

PISTON RING.

Application filed May 19, 1924. Serial No. 714,256.

*To all whom it may concern:*

Be it known that I, CHARLES E. JOHNSON, a citizen of the United States of America, residing at Muskegon, in the county of Muskegon and State of Michigan, have invented certain new and useful Improvements in Piston Rings; and I do hereby declare the following to be a full, clear, and exact description of the invention, such as will enable others skilled in the art to which it appertains to make and use the same.

This invention relates to piston rings and is concerned with certain novel improvements in the construction of piston ring shown in my pending application for patent Serial Number 701,245, filed March 24, 1924. The present invention is directed to a novel construction of piston ring and method of producing the same, the ring produced being simple in the matter of manufacturing and exceptionally effective in removing excess oil which may adhere to the inner walls of the engine cylinders in which a piston equipped with the rings reciprocates. The production of the ring is very economical, the same being produced in large quantities at low cost.

For an understanding of the invention whereby these desirable objects and purposes, as well as many others not stated at this time, are attained, reference may be had to the following description, in connection with the accompanying drawings, in which, Fig. 1 is an under plan view of a piston ring, with parts broken away and shown in section, made in accordance with the invention, the saw for cutting the slots through the ring being shown.

Like reference characters refer to like parts in the different figures of the drawings.

The piston ring 1 as shown is rectangular in cross section and substantially circular in outline, having a parting 2 at one side which normally opens a distance under the spring of the ring, the ring when the parting is closed being practically perfectly circular in outline. This type of ring is old and my invention is directed to additional features and constructions imposed thereon.

Figure 1:
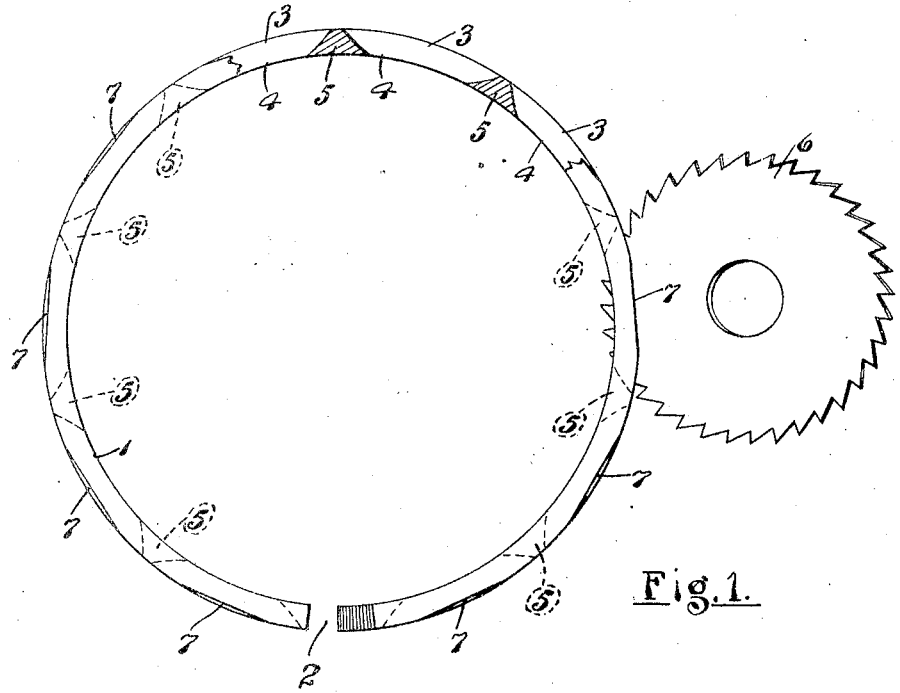
Figure 4:
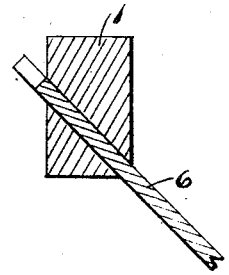
Fig. 4 is an enlarged vertical section through one side of the piston ring, and illustrating the manner in which the slots are cut therein.
Figure 6:
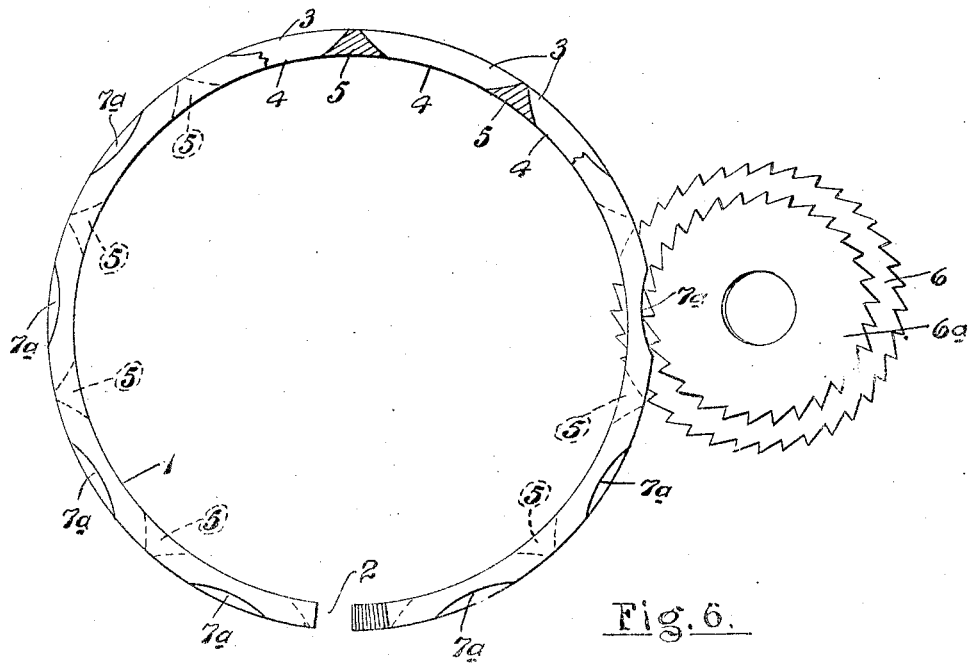
Fig. 6 is a view similar to that shown in Fig. 1, showing a slightly modified construction of piston ring and the manner of making the same.
Figure 7:
Fig. 7 is an elevation of the ring shown in Fig. 6.
Figure 8:
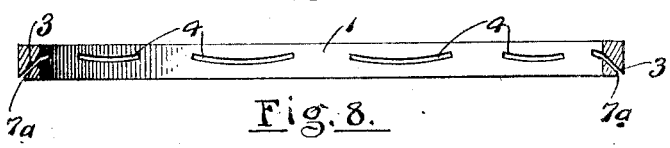
Fig. 8 is a vertical section therethrough.
Figure 9:
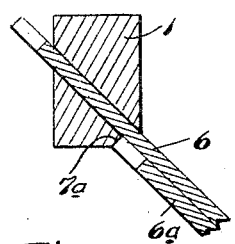
Fig. 9 is a view like that shown in Fig. 4 illustrating the manner in which the modified ring is made.

With my invention rings of the type described are sawed through from the outside inward to make slots 3 which are spaced apart in the length of the ring. A metal cutting saw of circular form is used and the saw is located at a relatively sharp angle to the vertical, the slot 3 cut extending upwardly and inwardly from the lower outer corner of the ring cross section to a point a short distance below the upper inner corner thereof, as shown in Fig. 4. By reason of the circular cutting saw and the circular form of the ring 1 curved away from the saw, the slots 3 at the outer sides of the ring are longer than at the inner sides where the saw comes through, as indicated at 4, there being sections 5 nearly triangular in cross section between adjacent slots, as best shown in Fig. 1 or in Fig. 6.

Figure 2:
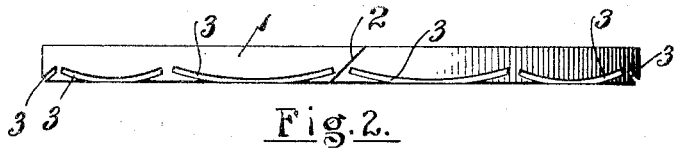
Fig. 2 is an elevation of the piston ring.
Figure 3:
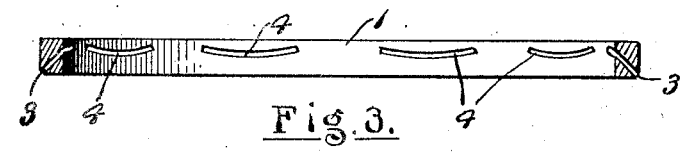
Fig. 3 is a vertical section therethrough.

The slots are cut in consecutive order around the ring by the saw 6. The saw is disposed at an angle to the plane of the ring and as thus positioned, the slots 3 curve upwardly at each end from the mid-point of each slot at the outer curved side of the ring. Preferably the ends of adjacent slots are spaced short distances apart, as shown in Fig. 2 and the parting cut may be made to lie between the adjacent ends of two of the said slots, though this is not a necessary feature of the construction.

As the saw cuts upwardly and inwardly from the lower outer corner of the ring, a tangent portion is removed by the saw at the under side of the ring, as indicated at 7, it being apparent that the ring is thus cut back for a short distance directly below the middle part of each slot and under the overhanging scraping edge made between the outer side of the ring and the upper side of each slot 3.

Figure 5:
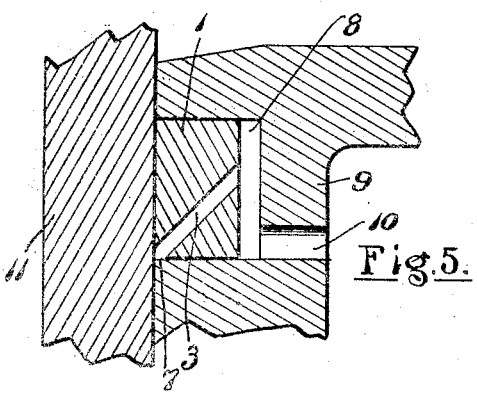
Fig. 5 is a fragmentary enlarged vertical section through a cylinder wall and adjacent parts of a piston and the piston ring carried in the ring groove thereof.

In Fig. 5, a ring made in accordance with the above described method is shown located in a ring groove 8 around a piston 9, there being an opening 10 shown as one of a series of openings from the lower inner portion of the ring groove to the interior of the piston to serve as drainage openings for oil which is collected in the ring groove. The piston is adapted to reciprocate in a cylinder bounded by cylinder walls, as 11 with the ring 1 bearing against the inner walls of the cylinder. On the down stroke of the piston, oil which may be adhering to the cylinder walls is scraped therefrom passing through the slots 3 to the ring grooves 8 and back of the rings carried by the piston. The tangent portion cut away at 7 furnishes a better opening for the passage of the oil to the slot 3 and removes a portion of the piston ring below the slot for the better collection and scraping of the oil from the cylinder walls. And the scalloped form of the slots 3 at their outer ends, as in my previous application for patent referred to, provides not only a scraping but a shearing action which serves to completely remove excess of oil from the cylinder walls.

In Figs. 6 to 10 inclusive, a second smaller saw is used with the slot cutting saw. This is shown at 6ª as lying directly against the slotting saw 6 and on the side thereof so that when a slot 3 is cut, the saw 6ª comes into play to remove an arcuate portion 7ª from the lower edge of the ring below the slot. The saw or cutter 6ª removes only a small portion of the metal and that at the thinnest edge thereof below each slot. This is desirable in order that rough edges shall not be present, particularly if the angle of the slots through the ring should be changed so that said slots more nearly approach the horizontal. At the angle shown, the edges at the upper and lower sides of the slots are not rough or broken, but the invention is not to be limited to any particular angle that the slot is to be cut.

Figure 10:
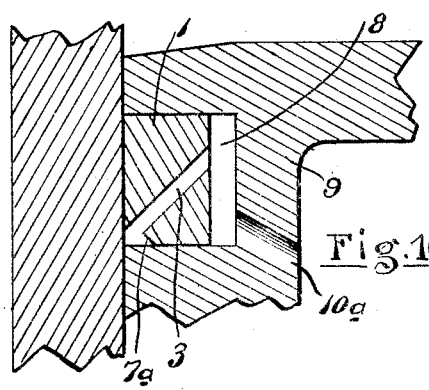
Fig. 10 is a view like Fig. 5, showing the modified or different ring in a ring groove of a piston.

This construction operates in the same manner as described with reference to the construction illustrated in Figs. 1 to 5 inclusive. In Fig. 10, the ring is shown seated in a ring groove 8 of a piston 9, the same as in Fig. 5, the drainage openings 10ª being positioned downwardly and inwardly at an angle to the horizontal. Both forms of the ring are very practical and efficient and act to save lubricating oil in internal combustion engines to a considerable degree, while the additional cost of manufacture over and above the plain snap ring is very small.

The invention is defined in the appended claims and is to be considered as comprehensive of all forms of structure coming within their scope.

I claim:

1. A piston ring of substantially circular outline having a plurality of slots cut therein from its outer curved to its inner curved side, said slots being cut upwardly and inwardly at an angle to the upper and lower sides of the ring, the ends of the slots being spaced short distances apart and said slots being cut at spaced apart points from the outer lower corners of the ring whereby portions of the metal are removed from the ring at the lower side thereof adjacent the outer curved side thereof.

2. A piston ring of substantially circular outline having a plurality of slots cut therein from its outer curved to its inner curved side, said slots being cut upwardly and inwardly at an angle to the upper and lower sides of the ring, and said slots being cut from the lower outer corners of the ring whereby portions of the metal are removed from the ring at its lower side and adjacent the outer curved side thereof.

3. A piston ring of substantially circular outline having a plurality of slots cut therein from its outer curved to its inner curved side, said slots at the outer curved side of the ring being of scalloped form with end portions curved upwardly each way from their lower middle points, the middle points of the said scallops extending to the lower side of the ring.

4. A substantially circular piston ring having a slot therethrough with flat sides inclined to the parallel sides of the ring, the slot at its outer end extending partly into and removing a portion of the metal of the ring at the lower side and adjacent its outer curved side.

5. A substantially circular ring having a circumferentially extending series of slots therethrough with flat sides inclined to the parallel sides of the ring, said slots at their outer ends extending partly into and removing portions of the metal of the ring at the lower side and adjacent its outer curved side.

6. A substantially circular ring having a circumferentially extending series of slots therethrough having flat sides inclined to the parallel sides of the ring and with circularly arcuate inner and outer ends, said outer ends at their mid portions extending into and removing portions of the metal of the ring at the lower side and adjacent its outer curved side.

In testimony whereof I affix my signature.

CHARLES E. JOHNSON.